United States Patent Office 3,221,018
Patented Nov. 30, 1965

3,221,018
N-CYCLOPROPYL AMIDES OF 4-PHENYL-1,2,5,6-TETRAHYDROPYRIDINO ALKANOIC ACIDS AND INTERMEDIATES THEREOF
John H. Biel and Harvey B. Hopps, Milwaukee, Wis., assignors to Aldrich Chemical Company, Inc., Milwaukee, Wis., a corporation of Wisconsin
No Drawing. Filed Apr. 7, 1964, Ser. No. 358,101
14 Claims. (Cl. 260—295)

This invention relates to novel 4-arylpyridines. More particularly, this invention relates to N-cyclopropyl amides of 4 - phenyl - 1,2,5,6 - tetrahydropyridinoalkanoic acids and a process for the preparation thereof. In a further aspect, this invention relates to novel intermediates useful in processes for preparing the novel 4-arylpyridines of this invention.

In accordance with the present invention, there is provided a member selected from the group consisting of 4-arylpyridines of the formula (I)

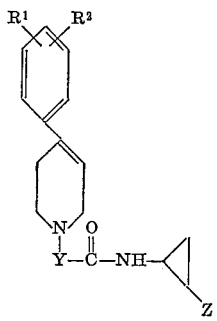

wherein:

$R^1$ and $R^2$ are each a member selected from the group consisting of hydrogen, chloro, bromo, iodo, fluoro, trifluoromethyl, amino, nitro, (lower)alkyl, (lower) alkoxy, hydroxy, phenyl, phenoxy, benzyl, (lower) alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive,
Y is a (lower)alkylene radical,
Z is a member selected from the group consisting of hydrogen, (lower)alkyl, pyridyl, thienyl and radicals of the formulae (II)

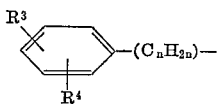

and (III)

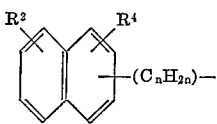

wherein:

$n$ is a whole integer from 0 to 6 inclusive, and
$R^3$ and $R^4$ are each a member selected from the group consisting of hydrogen, chloro, bromo, iodo, fluoro, trifluoromethyl, amino, nitro, (lower)alkyl, (lower) alkoxy, hydroxy, phenyl, phenoxy, benzyl, (lower) alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive;

and the pharmaceutically acceptable nontoxic salts thereof.

Among the radicals represented by $R^1$, $R^2$, $R^3$ and $R^4$, hydrogen, chloro, bromo, iodo, fluoro, trifluoromethyl, nitro, (lower)alkyl, (lower)alkoxy, (lower)alkylthio, (lower)alkanoyl, phenyl, phenoxy and benzyl are preferred. Preferably $R^1$ or $R^2$ and $R^3$ or $R^4$ are hydrogen and usually $R^1$, $R^2$, $R^3$ and $R^4$ are all hydrogen.

The pharmaceutically acceptable nontoxic salts include the organic and inorganic acid addition salts, e.g., those prepared from acids such as hydrochloric, sulfuric, sulfamic, tartaric, fumaric, hydrobromic, hydroiodic, glycolic, citric, maleic, phosphoric, succinic, acetic and the like.

The term "(lower)alkyl" as used herein means both straight and branched chain aliphatic hydrocarbon radicals having from 1 to 8 carbon atoms such as methyl, ethyl, propyl, isopropyl, butyl, isobutyl, t-butyl, amyl, hexyl, 2-ethylhexyl, etc.

Similarly, where the term "(lower)" is used as part of the description of another group, e.g., "(lower)alkoxy," it refers to the alkyl portion of such group which is therefore as described in connection with "(lower)alkyl."

The meaning of the term "(lower)alkylene" is similar to that of "(lower)alkyl" in that it also means both straight and branched chain aliphatic hydrocarbon radicals having from 1 to 8 carbon atoms. Examples of "(lower)alkylene" radicals are methylene, ethylene, propylene, isopropylene, butylene, isobutylene, t-butylene, amylene, hexylene, 2-ethylhexylene and the like.

The compounds of this invention are valuable pharmaceutical agents. They produce pain relief and reduce blood pressure, which makes the compounds useful as analegesic agents and antihypertensive agents. In addition, the compounds, being tertiary bases, can be used to recover and purify penicillin with which they form salts.

The 4-arylpyridines of the present invention were tested for analgesic activity by the phenylquinone test of Sigmund et al., Proc. Soc. Expt'l. Biol. and Med., 95, 729 (1957) in which an analgesic reduces the induced writhing of the mice. The compounds were administered at dosages of 39 mgm./kg. p.o. in mice, 50 minutes before the phenyl-p-quinone was injected. The reduction in induced writhing was determined at the end of the first hour. When, for example, N-(2-phenylcyclopropyl)-β-(4-phenyl-1,2,5,6-tetrahydropyridino)-propionamide was tested, the reduction in induced writhing at the end of the first hour was found to be 17% for the compounds. This indicated that N-(2-phenylcyclopropyl)-β-(4,phenyl-1, 2, 5, 6-tetrahydropyridino)propionamide is an analgesic agent.

The compounds of the present invention are prepared by the following series of steps:

(1) A cyclopropylamine of the formula

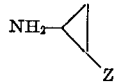

wherein Z is as represented above is reacted with an equimolar quantity of a halo or tosylacid chloride of the formula

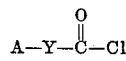

wherein A is a radical selected from the group consisting of chloro, bromo, iodo or tosyl, and Y is as represented above, according to the method described in U.S. Patent No. 2,569,288,

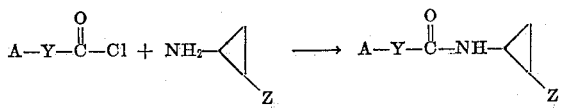

wherein A, Y and Z are as previously defined. The product, an N-cyclopropyl halo- or tosylalkanoic acid amide, is a novel intermediate, useful in the second step of the method for the preparation of the 4-arylpyridines of Formula I, and is considered within the scope of this invention.

(2) The N-cyclopropyl halo- or tosylalkanoic acid amide prepared in step 1 is then reacted with an equimolar quantity of a 1,2,5,6-tetrahydropyridine of the formula

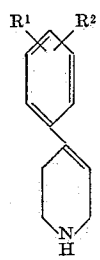

wherein $R^1$ and $R^2$ are as described above, in the presence of triethylamine and dimethylformamide, and a trace of potassium iodide at elevated temperature, i.e., 65°–70° C., for several hours according to the procedure described in U.S. Patent No. 2,929,818. The cooled reaction mixture is then poured into water containing an equimolar amount of sodium hydroxide. The free base is collected by filtration and dried.

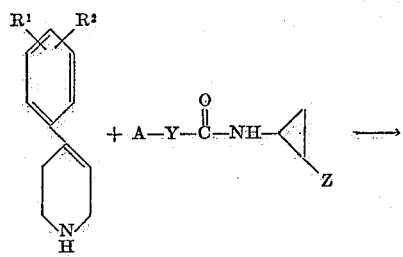

wherein A, $R^1$, $R^2$, Y and Z are as defined above.

The free base may be readily converted, if desired, to a nontoxic acid addition salt by conventional procedures.

An alternate procedure for preparing the compounds of the invention comprises the addition of the 1,2,5,6-tetrahydropyridine to an acrylic acid amide or a substituted acid amide in the presence of a strong base, e.g., sodium hydroxide, according to the equation

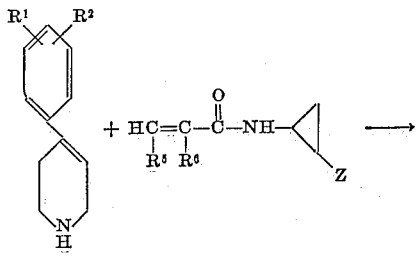

wherein $R^1$, $R^2$ and Z are as represented above, and $R^5$ and $R^6$ are each hydrogen or (lower)alkyl.

A third procedure by which the compounds can be prepared involves the reaction of a halo- or tosylalkanoic acid ester with the 1,2,5,6-tetrahydropyridine and subsequent conversion to the amide

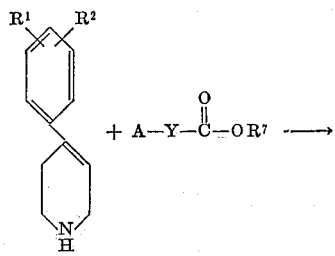

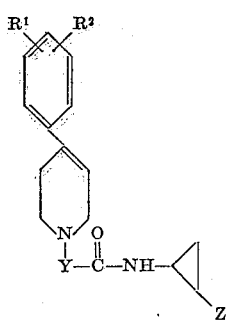

wherein A, $R^1$, $R^2$, Y and Z are as described above and $R^7$ is methyl, ethyl, p-nitrophenyl, cyanomethyl, succinimido, phthalimido, and $OR^7$ may also be chloro or bromo.

In each of the three methods for the preparation of the compounds of this invention, the 1,2,5,6-tetrahydropyridine and other reactants are brought together in a suitable medium such as dimethylformamide, ethanol, isopropyl alcohol, toluene, xylene, dimethoxyethane, diethyleneglycol and heated at 50°–100° C. for several hours in the presence of a base such as triethylamine, aminopyrine, diethylaniline, potassium carbonate, and triethylphenyl ammonium hydroxide. The cooled reaction mixture is then poured into dilute sodium hydroxide. The basic amide or ester precipitates either as a water insoluble oil or a crystalline solid and is extracted with such solvents as methylene dichloride, chloroform, carbon tetrachloride or by filtration of the solid product. In the case of the third process, the ester that is obtained is reacted with cyclopropylamine, or a substituted cyclopropylamine, the product is then converted to a nontoxic acid addition salt.

It is obvious that in some cases the radicals attached to the aromatic ring, e.g., the amino radical, will interfere with the reactions used in preparing the compounds of this invention. Therefore, it is necessary to block the reactive radicals before proceeding with the reactions. This is conveniently accomplished by methods known in the art. For example, in the case of an amino substituted aromatic ring, the amino group is blocked by forming the Schiffs' base by reacting the aromatic amine with an aldehyde such as acetaldehyde, and after all reactions have been completed, the Schiffs' base may be cleaved with dilute hydrochloric acid to regenerate the free amino group.

The starting materials used in the processes described herein are compounds which are either commercially available, well known in the art, or easily prepared in accordance with standard organic procedures previously described in the chemical literature.

The compounds of this invention may be administered as the free bases or in the form of their nontoxic addition salts. They may be compounded and formulated into pharmaceutical preparations for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The following examples are intended to illustrate the invention described herein without unduly restricting it.

EXAMPLE 1

*Preparation of N-2-phenylcyclopropyl-β-choropropionamide*

To a slurry of 2-phenylcyclopropylamine (6.7 g, 0.05 mole) and water (30 ml.), cooled by means of an ice water bath to 10° C., is added 3-chloropropionyl chloride (6.4 g., 0.05 mole) and a solution of sodium hydroxide (2 g., 0.05 mole) dissolved in water (20 ml.). The rate of addition of the liquids is such as to keep the temperature below 15° C. and the pH near 8. Upon completion of the addition, the mixture is stirred briefly, and permitted to stand overnight. The resulting solid is collected when dry, and weighs 6.25 g., M.P. 111–115° C. One recrystallization from benzene gives 5.5 g. of white solid, N-2-phenylcyclopropyl-β-chloropropionamide, M.P. 114–115° C.

*Analysis.*—Calculated for $C_{12}H_{14}$ ClNO: C, 64.42; H, 6.31; N, 6.26; Cl, 15.85. Found: C, 64.93; H, 6.28; N, 6.47; Cl, 15.61.

EXAMPLE 2

When, in the procedure of Example 1, the 2-phenylcyclopropylamine is replaced by an equal molar amount of cyclopropylamine, 2-methylcyclopropylamine,
2-ethylcyclopropylamine,
2-isopropylcyclopropylamine,
2-phenylcyclopropylamine,
2-benzylcyclopropylamine,
2-1-naphthylcyclopropylamine,
2-2-naphthylcyclopropylamine,
2-1-naphthylmethylcyclopropylamine,
2-pyridylcyclopropylamine,
2-3-thienylcyclopropylamine,
2-2-thienylcyclopropylamine,
2-4-chlorophenylcyclopropylamine,
2-4-trifluoromethylphenylcyclopropylamine,
2-4-methylphenylcyclopropylamine,
2-2-fluorophenylcyclopropylamine,
2-3-methylphenylcyclopropylamine,
2-3-bromophenylcyclopropylamine,
2-4-hydroxyphenylcyclopropylamine,
2-2-methylaminophenylcyclopropylamine,
2-4-dimethylaminophenylcyclopropylamine,
2-2,6-dichlorophenylcyclopropylamine,
2-4-methylthiophenylcyclopropylamine,
2-2-sulfamylphenylcyclopropylamine,
2-4-cyclohexylphenylcyclopropylamine,
2-4-cyclohexyloxyphenylcyclopropylamine,
2-4-nitrophenylcyclopropylamine,
2-2-aminophenylcyclopropylamine,
2-2-iodo-4-methylphenylcyclopropylamine,
2-4-isopropylphenylcyclopropylamine,
2-4-phenylphenylcyclopropylamine,
2-3-phenoxyphenylcyclopropylamine,
2-4-benzylphenylcyclopropylamine,
2-3-acetamidophenylcyclopropylamine,
2-4-acetylphenylcyclopropylamine,
2-2-ethylsulfonylphenylcyclopropylamine,
2-3,4-methylenedioxyphenylcyclopropylamine,
2-4-fluorophenylcyclopropylamine,
2-4-chlorobenzylphenylcyclopropylamine,
2-1-methyl-2-naphthylcyclopropylamine,
2-2-chloro-1-naphthylmethylcyclopropylamine, and
2-7-phenethylcyclopropylamine, to produce cyclopropyl-β-chloropropionamide,
2-methylcyclopropyl-β-chloropropionamide,
2-ethylcyclopropyl-β-chloropropionamide,
2-isopropylcyclopropyl-β-chloropropionamide,
2-phenylcyclopropyl-β-chloropropionamide,
2-benzylcyclopropyl-β-chloropropionamide,
2-1-naphthylcyclopropyl-β-chloropropionamide,
2-2-naphthylcyclopropyl-β-chloropropionamide,
2-1-naphthylmetyhlcyclopropyl-β-chloropropionamide,
2-pyridylcyclopropyl-β-chloropropionamide,
2-3-thienylcyclopropyl-β-chloropropionamide,
2-2-thienylcyclopropyl-β-chloropropionamide,
2-4-chlorophenylcyclopropyl-β-chloropropionamide,
2 - 4 - trifluoromethylphenylcyclopropyl-β-chloropropionamide,
2-4-methylphenylcyclopropyl-β-chloropropionamide,
2-2-fluorophenylcyclopropyl-β-chloropropionamide,
2-3-methylphenylcyclopropyl-β-chloropropionamide,
2-3-bromophenylcyclopropyl-β-chloropropionamide,
2-4-hydroxyphenylcyclopropyl-β-chloropropionamide,
2 - 2 - methylaminophenylcyclopropyl - β - chloropropionamide,
2 - 4 - dimethylaminophenylcyclopropyl - β - chloropropionamide,
2-2,6-dichlorophenylcyclopropyl-β-chloropropionamide,
2-4-methylthiophenylcyclopropyl-β-chloropropionamide,
2-2-sulfamylphenylcyclopropyl-β-chloropropionamide,
2-4-cyclohexylphenylcyclopropyl-β-chloropropionamide,
2 - 4 - cyclohexyloxyphenylcyclopropyl - β - chloropropionamide,
2-4-nitrophenylcyclopropyl-β-chloropropionamide,
2-2-aminophenylcyclopropyl-β-chloropropionamide,
2 - 2 - iodo-4-methylphenylcyclopropyl-β-chloropropionamide,
2-4-isopropylphenylcyclopropyl-β-chloropropionamide,
2-4-phenylphenylcyclopropyl-β-chloropropionamide,
2-3-phenoxyphenylcyclopropyl-β-chloropropionamide,
2-4-benzylphenylcyclopropyl-β-chloropropionamide,
2-3-acetamidophenylcyclopropyl-β-chloropropionamide,
2-4-acetylphenylcyclopropyl-β-chloropropionamide,
2 - 2 - ethylsulfonylphenylcyclopropyl - β-chloropropionamide,
2 - 3,4 - methylenedioxyphenylcyclopropyl-β-chloropropionamide,
2-4-fluorophenylcyclopropyl-β-chloropropionamide,
2 - 4 - chlorobenzylphenylcyclopropyl - β - chloropropionamide,
2-1-methyl-2-naphthylcyclopropyl-β-chloropropionamide,
2 - 2 - chloro-1-naphthylmethylcyclopropyl-β-chloropropionamide, and
2-7-phenethylcyclopropyl-β-chloropropionamide, respectively.

EXAMPLE 3

When, in the procedure of Example 1, the β-chloropropionyl chloride is replaced by 0.05 mole of Chloroacetyl chloride,
α-chloropropionyl chloride,
γ-chlorobutyryl chloride,
α-chloroisobutyryl chloride,
β-bromopropionyl chloride,
β-iodopropionyl chloride,
γ-chlorohexanoyl chloride, and
β-tosylpropionyl chloride, respectively, the following compounds are produced, N-2-phenylcyclopropyl-chloroacetamide,
N-2-phenylcyclopropyl-α-chloropropionamide,
N-2-phenylcyclopropyl-γ-chlorobutyramide,
N-2-phenylcyclopropyl-α-chloroisobutyramide,
N-2-phenylcyclopropyl-β-bromopropionamide,
N-2-phenylcyclopropyl-β-iodopropionamide,
N-2-phenylcyclopropyl-γ-chlorohexanoamide, and
N-2-phenylcyclopropyl-β-tosylpropionamide, respectively.

EXAMPLE 4

*Preparation of N-2-phenylcyclopropyl-β-(4-phenyl-1,2,5,6-tetrahydropyridino)propionamide*

A mixture containing 0.05 mole of 4-phenyl-1,2,5,6-tetrahydropyridine, 0.05 mole of N-2-phenylcyclopropyl-β-chloropropionamide, 0.05 mole of triethylamine, 30 ml. of dimethylformamide, and 100 mg. of potassium iodide is stirred and heated at 65–70° C. for approximately 4 hours. The cooled reaction mixture is poured into ca. 300 ml. of water containing 0.05 mole of sodium hydroxide. The N - 2-phenylcyclopropyl-β-(4-phenyl-1,2,5,6-tetrahydropyridino)propionamide precipitates and is separated by filtration.

EXAMPLE 5

*Preparation of N-2-phenylcyclopropyl-β-(4-phenyl-1,2,5,6-tetrahydropyridino)propionamide hydrochloride*

The compound, N-2-phenylcyclopropyl-β-(4-phenyl-1,2,5,6-tetrahydropyridino)propionamide, prepared in Example 4, is dissolved in methylene chloride and converted to its hydrochloride salt by passing gaseous hydrogen chloride into the solution. The N-2-phenylcyclopropyl-β-(4-phenyl-1,2,5,6-tetrahydropyridino)propionamide hydrochloride precipitates out, and is recrystallized from n-butanol.

EXAMPLE 6

When, in the procedure of Example 4, the 4-phenyl-1,2,5,6-tetrahydropyridine is replaced by an equal molar amount of 4-4-chlorophenyl-1,2,5,6-tetrahydropyridine,
4-4-trifluoromethylphenyl-1,2,5,6-tetrahydropyridine,
4-3-fluorophenyl-1,2,5,6-tetrahydropyridine,
4-2-trifluoromethylphenyl-1,2,5,6-tetrahydropyridine,
4-2-bromophenyl-1,2,5,6-tetrahydropyridine,
4-3-chlorophenyl-1,2,5,6-tetrahydropyridine,
4-2-sulfamylphenyl-1,2,5,6-tetrahydropyridine,
4-3-hydroxyphenyl-1,2,5,6-tetrahydropyridine,
4-4-ethylphenyl-1,2,5,6-tetrahydropyridine,
4-3-methylphenyl-1,2,5,6-tetrahydropyridine,
4-2,4-dimethoxyphenyl-1,2,5,6-tetrahydropyridine,
4-3-methylthiophenyl-1,2,5,6-tetrahydropyridine,
4-2-aminophenyl-1,2,5,6-tetrahydropyridine,
4-2-chlorophenyl-1,2,5,6-tetrahydropyridine,
4-3-trifluoromethylphenyl-1,2,5,6-tetrahydropyridine,
4-3,4-methylenedioxyphenyl-1,2,5,6-tetrahydropyridine,
4-4-methoxyphenyl-1,2,5,6-tetrahydropyridine,
4-2-methylaminophenyl-1,2,5,6-tetrahydropyridine,
4-3-diethylaminophenyl-1,2,5,6-tetrahydropyridine,
4-2-acetylphenyl-1,2,5,6-tetrahydropyridine,
4-4-acetamidophenyl-1,2,5,6-tetrahydropyridine,
4-2-propylthiophenyl-1,2,5,6-tetrahydropyridine,
4-(2-hydroxy-4-nitrophenyl)-1,2,5,6-tetrahydropyridine,
4-4-phenylphenyl-1,2,5,6-tetrahydropyridine,
4-3-benzylphenyl-1,2,5,6-tetrahydropyridine,
4-3-phenoxyphenyl-1,2,5,6-tetrahydropyridine,
4-4-cyclohexylphenyl-1,2,5,6-tetrahydropyridine,
4-4-cycloheptyloxyphenyl-1,2,5,6-tetrahydropyridine,
4-2-iodophenyl-1,2,5,6-tetrahydropyridine,
4-2-methylthiophenyl-1,2,5,6-tetrahydropyridine, and
4-4-ethylsulfonylphenyl-1,2,5,6-tetrahydropyridine, the following compounds are produced, N-2-phenylcyclopropyl-β-[4-(4-chlorophenyl)-1,2,5,6-tetrahydropyridino]propionamide,
N-2-phenylcyclopropyl-β-[4-(4-trifluoromethylphenyl)-1,2,5,6-tetrahydropyridino]propionamide,
N-2-phenylcyclopropyl-β-[4-(3-fluorophenyl)-1,2,5,6-tetrahydropyridino]propionamide,
N-2-phenylcyclopropyl-β-[4-(2-trifluoromethylphenyl)-1,2,5,6-tetrahydropyridino]propionamide,
N-2-phenylcyclopropyl-β-[4-(2-bromophenyl)-1,2,5,6-tetrahydropyridino]propionamide,
N-2-phenylcyclopropyl-β-[4-(3-chlorophenyl)-1,2,5,6-tetrahydropyridino]propionamide,
N-2-phenylcyclopropyl-β-[4-(2-sulfamylphenyl)-1,2,5,6-tetrahydropyridino]propionamide,
N-2-phenylcyclopropyl-β-[4-(3-hydroxyphenyl)-1,2,5,6-tetrahydropyridino]propionamide,
N-2-phenylcyclopropyl-β-[4-(4-ethylphenyl)-1,2,5,6-tetrahydropyridino]propionamide,
N-2-phenylcyclopropyl-β-[4-(3-methylphenyl)-1,2,5,6-tetrahydropyridino]propionamide,
N-2-phenylcyclopropyl-β-[4-(2,4-dimethoxyphenyl)-1,2,5,6-tetrahydropyridino]propionamide,
N-2-phenylcyclopropyl-β-[4-(3-methylthiophenyl)-1,2,5,6-tetrahydropyridino]propionamide,
N-2-phenylcyclopropyl-β-[4-(2-aminophenyl)-1,2,5,6-tetrahydropyridino]propionamide,
N-2-phenylcyclopropyl-β-[4-(2-chlorophenyl)-1,2,5,6-tetrahydropyridino]propionamide,
N-2-phenylcyclopropyl-β-[4-(3-trifluoromethylphenyl)-1,2,5,6-tetrahydropyridino]propionamide,
N-2-phenylcyclopropyl-β-[4-(3,4-methylenedioxyphenyl)-1,2,5,6-tetrahydropyridino]propionamide,
N-2-phenylcyclopropyl-β-[4-(4-methoxyphenyl)-1,2,5,6-tetrahydropyridino]propionamide,
N-2-phenylcyclopropyl-β-[4-(2-methylaminophenyl)-1,2,5,6-tetrahydropyridino]propionamide,
N-2-phenylcyclopropyl-β-[4-(3-diethylaminophenyl)-1,2,5,6-tetrahydropyridino]propionamide,
N-2-phenylcyclopropyl-β-[4-(2-acetylphenyl)-1,2,5,6-tetrahydropyridino]propionamide,
N-2-phenylcyclopropyl-β-[4-(4-acetamidophenyl)-1,2,5,6-tetrahydropyridino]propionamide,
N-2-phenylcyclopropyl-β-[4-(2-propylthiophenyl)-1,2,5,6-tetrahydropyridino]propionamide,
N-2-phenylcyclopropyl-β-[4-(2-hydroxy-4-nitrophenyl)-1,2,5,6-tetrahydropyridino]propionamide,
N-2-phenylcyclopropyl-β-[4-(4-phenylphenyl)-1,2,5,6-tetrahydropyridino]propionamide,
N-2-phenylcyclopropyl-β-[4-(3-benzylphenyl)-1,2,5,6-tetrahydropyridino]propionamide,
N-2-phenylcyclopropyl-β-[4-(3-phenoxyphenyl)-1,2,5,6-tetrahydropyridino]propionamide,
N-2-phenylcyclopropyl-β-[4-(4-cyclohexylphenyl)-1,2,5,6-tetrahydropyridino]propionamide,
N-2-phenylcyclopropyl-β-[4-(4-cycloheptyloxyphenyl)-1,2,5,6-tetrahydropyridino]propionamide,
N-2-phenylcyclopropyl-β-[4-(2-iodophenyl)-1,2,5,6-tetrahydropyridino]propionamide,
N-2-phenylcyclopropyl-β-[4-(2-methylthiophenyl)-1,2,5,6-tetrahydropyridino]propionamide, and
N-2-phenylcyclopropyl-β-[4-(4-ethylsulfonylphenyl)-1,2,5,6-tetrahydropyridino]propionamide.

respectively.

It is obvious that in some cases the radicals attached to the aromatic ring, e.g., the amino radical, will interfere with the reactions used in preparing the compounds of this invention. Therefore, it is necessary to block the reactive radicals before proceeding with the reactions. This is conveniently accomplished by methods known in the art. For example, in the case of an amino substituted aromatic ring, the amino group is blocked by forming the Schiffs' base by reacting the aromatic amine with an aldehyde such as acetaldehyde, and after all reactions have been completed, the Schiffs' base may be cleaved with dilute hydrochloric acid to regenerate the free amino group.

The starting materials used in the processes described herein are compounds which are either commercially available, well known in the art, or easily prepared in accordance with standard organic procedures previously described in the chemical literature.

The compounds of this invention may be administered as the free bases or in the form of their nontoxic addition salts. They may be compounded and formulated into pharmaceutical preparations for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The following examples are intended to illustrate the invention described herein without unduly restricting it.

EXAMPLE 1

*Preparation of N-2-phenylcyclopropyl-β-choropropionamide*

To a slurry of 2-phenylcyclopropylamine (6.7 g, 0.05 mole) and water (30 ml.), cooled by means of an ice water bath to 10° C., is added 3-chloropropionyl chloride (6.4 g., 0.05 mole) and a solution of sodium hydroxide (2 g., 0.05 mole) dissolved in water (20 ml.). The rate of addition of the liquids is such as to keep the temperature below 15° C. and the pH near 8. Upon completion of the addition, the mixture is stirred briefly, and permitted to stand overnight. The resulting solid is collected when dry, and weighs 6.25 g., M.P. 111–115° C. One recrystallization from benzene gives 5.5 g. of white solid, N-2-phenylcyclopropyl-β-chloropropionamide, M.P. 114–115° C.

*Analysis.*—Calculated for $C_{12}H_{14}ClNO$: C, 64.42; H, 6.31; N, 6.26; Cl, 15.85. Found: C, 64.93; H, 6.28; N, 6.47; Cl, 15.61.

EXAMPLE 2

When, in the procedure of Example 1, the 2-phenylcyclopropylamine is replaced by an equal molar amount of cyclopropylamine, 2-methylcyclopropylamine,
2-ethylcyclopropylamine,
2-isopropylcyclopropylamine,
2-phenylcyclopropylamine,
2-benzylcyclopropylamine,
2-1-naphthylcyclopropylamine,
2-2-naphthylcyclopropylamine,
2-1-naphthylmethylcyclopropylamine,
2-pyridylcyclopropylamine,
2-3-thienylcyclopropylamine,
2-2-thienylcyclopropylamine,
2-4-chlorophenylcyclopropylamine,
2-4-trifluoromethylphenylcyclopropylamine,
2-4-methylphenylcyclopropylamine,
2-2-fluorophenylcyclopropylamine,
2-3-methylphenylcyclopropylamine,
2-3-bromophenylcyclopropylamine,
2-4-hydroxyphenylcyclopropylamine,
2-2-methylaminophenylcyclopropylamine,
2-4-dimethylaminophenylcyclopropylamine,
2-2,6-dichlorophenylcyclopropylamine,
2-4-methylthiophenylcyclopropylamine,
2-2-sulfamylphenylcyclopropylamine,
2-4-cyclohexylphenylcyclopropylamine,
2-4-cyclohexyloxyphenylcyclopropylamine,
2-4-nitrophenylcyclopropylamine,
2-2-aminophenylcyclopropylamine,
2-2-iodo-4-methylphenylcyclopropylamine,
2-4-isopropylphenylcyclopropylamine,
2-4-phenylphenylcyclopropylamine,
2-3-phenoxyphenylcyclopropylamine,
2-4-benzylphenylcyclopropylamine,
2-3-acetamidophenylcyclopropylamine,
2-4-acetylphenylcyclopropylamine,
2-2-ethylsulfonylphenylcyclopropylamine,
2-3,4-methylenedioxyphenylcyclopropylamine,
2-4-fluorophenylcyclopropylamine,
2-4-chlorobenzylphenylcyclopropylamine,
2-1-methyl-2-naphthylcyclopropylamine,
2-2-chloro-1-naphthylmethylcyclopropylamine, and
2-7-phenethylcyclopropylamine, to produce cyclopropyl-β-chloropropionamide,
2-methylcyclopropyl-β-chloropropionamide,
2-ethylcyclopropyl-β-chloropropionamide,
2-isopropylcyclopropyl-β-chloropropionamide,
2-phenylcyclopropyl-β-chloropropionamide,
2-benzylcyclopropyl-β-chloropropionamide,
2-1-naphthylcyclopropyl-β-chloropropionamide,
2-2-naphthylcyclopropyl-β-chloropropionamide,
2-1-naphthylmetyhlcyclopropyl-β-chloropropionamide,
2-pyridylcyclopropyl-β-chloropropionamide,
2-3-thienylcyclopropyl-β-chloropropionamide,
2-2-thienylcyclopropyl-β-chloropropionamide,
2-4-chlorophenylcyclopropyl-β-chloropropionamide,
2 - 4 - trifluoromethylphenylcyclopropyl-β-chloropropionamide,
2-4-methylphenylcyclopropyl-β-chloropropionamide,
2-2-fluorophenylcyclopropyl-β-chloropropionamide,
2-3-methylphenylcyclopropyl-β-chloropropionamide,
2-3-bromophenylcyclopropyl-β-chloropropionamide,
2-4-hydroxyphenylcyclopropyl-β-chloropropionamide,
2 - 2 - methylaminophenylcyclopropyl - β - chloropropionamide,
2 - 4 - dimethylaminophenylcyclopropyl - β - chloropropionamide,
2-2,6-dichlorophenylcyclopropyl-β-chloropropionamide,
2-4-methylthiophenylcyclopropyl-β-chloropropionamide,
2-2-sulfamylphenylcyclopropyl-β-chloropropionamide,
2-4-cyclohexylphenylcyclopropyl-β-chloropropionamide,
2 - 4 - cyclohexyloxyphenylcyclopropyl - β - chloropropionamide,
2-4-nitrophenylcyclopropyl-β-chloropropionamide,
2-2-aminophenylcyclopropyl-β-chloropropionamide,
2 - 2 - iodo-4-methylphenylcyclopropyl-β-chloropropionamide,
2-4-isopropylphenylcyclopropyl-β-chloropropionamide,
2-4-phenylphenylcyclopropyl-β-chloropropionamide,
2-3-phenoxyphenylcyclopropyl-β-chloropropionamide,
2-4-benzylphenylcyclopropyl-β-chloropropionamide,
2-3-acetamidophenylcyclopropyl-β-chloropropionamide,
2-4-acetylphenylcyclopropyl-β-chloropropionamide,
2 - 2 - ethylsulfonylphenylcyclopropyl - β-chloropropionamide,
2 - 3,4 - methylenedioxyphenylcyclopropyl-β-chloropropionamide,
2-4-fluorophenylcyclopropyl-β-chloropropionamide,
2 - 4 - chlorobenzylphenylcyclopropyl - β - chloropropionamide,
2-1-methyl-2-naphthylcyclopropyl-β-chloropropionamide,
2 - 2 - chloro-1-naphthylmethylcyclopropyl-β-chloropropionamide, and
2-7-phenethylcyclopropyl-β-chloropropionamide, respectively.

EXAMPLE 3

When, in the procedure of Example 1, the β-chloropropionyl chloride is replaced by 0.05 mole of Chloroacetyl chloride,
α-chloropropionyl chloride,
γ-chlorobutyryl chloride,
α-chloroisobutyryl chloride,
β-bromopropionyl chloride,
β-iodopropionyl chloride,
γ-chlorohexanoyl chloride, and
β-tosylpropionyl chloride, respectively, the following compounds are produced, N-2-phenylcyclopropyl-chloroacetamide,
N-2-phenylcyclopropyl-α-chloropropionamide,
N-2-phenylcyclopropyl-γ-chlorobutyramide,
N-2-phenylcyclopropyl-α-chloroisobutyramide,
N-2-phenylcyclopropyl-β-bromopropionamide,
N-2-phenylcyclopropyl-β-iodopropionamide,
N-2-phenylcyclopropyl-γ-chlorohexanoamide, and
N-2-phenylcyclopropyl-β-tosylpropionamide, respectively.

EXAMPLE 4

*Preparation of N-2-phenylcyclopropyl-β-(4-phenyl-1,2,5,6-tetrahydropyridino)propionamide*

A mixture containing 0.05 mole of 4-phenyl-1,2,5,6-tetrahydropyridine, 0.05 mole of N-2-phenylcyclopropyl-β-chloropropionamide, 0.05 mole of triethylamine, 30 ml. of dimethylformamide, and 100 mg. of potassium iodide is stirred and heated at 65–70° C. for approximately 4 hours. The cooled reaction mixture is poured into ca. 300 ml. of water containing 0.05 mole of sodium hydroxide. The N - 2-phenylcyclopropyl-β-(4-phenyl-1,2,5,6-tetrahydropyridino)propionamide precipitates and is separated by filtration.

EXAMPLE 5

*Preparation of N-2-phenylcyclopropyl-β-(4-phenyl-1,2,5,6-tetrahydropyridino)propionamide hydrochloride*

The compound, N-2-phenylcyclopropyl-β-(4-phenyl-1,2,5,6-tetrahydropyridino)propionamide, prepared in Example 4, is dissolved in methylene chloride and converted to its hydrochloride salt by passing gaseous hydrogen chloride into the solution. The N-2-phenylcyclopropyl-β-(4-phenyl-1,2,5,6-tetrahydropyridino)propionamide hydrochloride precipitates out, and is recrystallized from n-butanol.

EXAMPLE 6

When, in the procedure of Example 4, the 4-phenyl-1,2,5,6-tetrahydropyridine is replaced by an equal molar amount of 4-4-chlorophenyl-1,2,5,6-tetrahydropyridine,
4-4-trifluoromethylphenyl-1,2,5,6-tetrahydropyridine,
4-3-fluorophenyl-1,2,5,6-tetrahydropyridine,
4-2-trifluoromethylphenyl-1,2,5,6-tetrahydropyridine,
4-2-bromophenyl-1,2,5,6-tetrahydropyridine,
4-3-chlorophenyl-1,2,5,6-tetrahydropyridine,
4-2-sulfamylphenyl-1,2,5,6-tetrahydropyridine,
4-3-hydroxyphenyl-1,2,5,6-tetrahydropyridine,
4-4-ethylphenyl-1,2,5,6-tetrahydropyridine,
4-3-methylphenyl-1,2,5,6-tetrahydropyridine,
4-2,4-dimethoxyphenyl-1,2,5,6-tetrahydropyridine,
4-3-methylthiophenyl-1,2,5,6-tetrahydropyridine,
4-2-aminophenyl-1,2,5,6-tetrahydropyridine,
4-2-chlorophenyl-1,2,5,6-tetrahydropyridine,
4-3-trifluoromethylphenyl-1,2,5,6-tetrahydropyridine,
4-3,4-methylenedioxyphenyl-1,2,5,6-tetrahydropyridine,
4-4-methoxyphenyl-1,2,5,6-tetrahydropyridine,
4-2-methylaminophenyl-1,2,5,6-tetrahydropyridine,
4-3-diethylaminophenyl-1,2,5,6-tetrahydropyridine,
4-2-acetylphenyl-1,2,5,6-tetrahydropyridine,
4-4-acetamidophenyl-1,2,5,6-tetrahydropyridine,
4-2-propylthiophenyl-1,2,5,6-tetrahydropyridine,
4-(2-hydroxy-4-nitrophenyl)-1,2,5,6-tetrahydropyridine,
4-4-phenylphenyl-1,2,5,6-tetrahydropyridine,
4-3-benzylphenyl-1,2,5,6-tetrahydropyridine,
4-3-phenoxyphenyl-1,2,5,6-tetrahydropyridine,
4-4-cyclohexylphenyl-1,2,5,6-tetrahydropyridine,
4-4-cycloheptyloxyphenyl-1,2,5,6-tetrahydropyridine,
4-2-iodophenyl-1,2,5,6-tetrahydropyridine,
4-2-methylthiophenyl-1,2,5,6-tetrahydropyridine, and
4-4-ethylsulfonylphenyl-1,2,5,6-tetrahydropyridine, the following compounds are produced, N-2-phenylcyclopropyl-β-[4-(4-chlorophenyl)-1,2,5,6-tetrahydropyridino]propionamide,
N-2-phenylcyclopropyl-β-[4-(4-trifluoromethylphenyl)-1,2,5,6-tetrahydropyridino]propionamide,
N-2-phenylcyclopropyl-β-[4-(3-fluorophenyl)-1,2,5,6-tetrahydropyridino]propionamide,
N-2-phenylcyclopropyl-β-[4-(2-trifluoromethylphenyl)-1,2,5,6-tetrahydropyridino]propionamide,
N-2-phenylcyclopropyl-β-[4-(2-bromophenyl)-1,2,5,6-tetrahydropyridino]propionamide,
N-2-phenylcyclopropyl-β-[4-(3-chlorophenyl)-1,2,5,6-tetrahydropyridino]propionamide,
N-2-phenylcyclopropyl-β-[4-(2-sulfamylphenyl)-1,2,5,6-tetrahydropyridino]propionamide,
N-2-phenylcyclopropyl-β-[4-(3-hydroxyphenyl)-1,2,5,6-tetrahydropyridino]propionamide,
N-2-phenylcyclopropyl-β-[4-(4-ethylphenyl)-1,2,5,6-tetrahydropyridino]propionamide,
N-2-phenylcyclopropyl-β-[4-(3-methylphenyl)-1,2,5,6-tetrahydropyridino]propionamide,
N-2-phenylcyclopropyl-β-[4-(2,4-dimethoxyphenyl)-1,2,5,6-tetrahydropyridino]propionamide,
N-2-phenylcyclopropyl-β-[4-(3-methylthiophenyl)-1,2,5,6-tetrahydropyridino]propionamide,
N-2-phenylcyclopropyl-β-[4-(2-aminophenyl)-1,2,5,6-tetrahydropyridino]propionamide,
N-2-phenylcyclopropyl-β-[4-(2-chlorophenyl)-1,2,5,6-tetrahydropyridino]propionamide,
N-2-phenylcyclopropyl-β-[4-(3-trifluoromethylphenyl)-1,2,5,6-tetrahydropyridino]propionamide,
N-2-phenylcyclopropyl-β-[4-(3,4-methylenedioxyphenyl)-1,2,5,6-tetrahydropyridino]propionamide,
N-2-phenylcyclopropyl-β-[4-(4-methoxyphenyl)-1,2,5,6-tetrahydropyridino]propionamide,
N-2-phenylcyclopropyl-β-[4-(2-methylaminophenyl)-1,2,5,6-tetrahydropyridino]propionamide,
N-2-phenylcyclopropyl-β-[4-(3-diethylaminophenyl)-1,2,5,6-tetrahydropyridino]propionamide,
N-2-phenylcyclopropyl-β-[4-(2-acetylphenyl)-1,2,5,6-tetrahydropyridino]propionamide,
N-2-phenylcyclopropyl-β-[4-(4-acetamidophenyl)-1,2,5,6-tetrahydropyridino]propionamide,
N-2-phenylcyclopropyl-β-[4-(2-propylthiophenyl)-1,2,5,6-tetrahydropyridino]propionamide,
N-2-phenylcyclopropyl-β-[4-(2-hydroxy-4-nitrophenyl)-1,2,5,6-tetrahydropyridino]propionamide,
N-2-phenylcyclopropyl-β-[4-(4-phenylphenyl)-1,2,5,6-tetrahydropyridino]propionamide,
N-2-phenylcyclopropyl-β-[4-(3-benzylphenyl)-1,2,5,6-tetrahydropyridino]propionamide,
N-2-phenylcyclopropyl-β-[4-(3-phenoxyphenyl)-1,2,5,6-tetrahydropyridino]propionamide,
N-2-phenylcyclopropyl-β-[4-(4-cyclohexylphenyl)-1,2,5,6-tetrahydropyridino]propionamide,
N-2-phenylcyclopropyl-β-[4-(4-cycloheptyloxyphenyl)-1,2,5,6-tetrahydropyridino]propionamide,
N-2-phenylcyclopropyl-β-[4-(2-iodophenyl)-1,2,5,6-tetrahydropyridino]propionamide,
N-2-phenylcyclopropyl-β-[4-(2-methylthiophenyl)-1,2,5,6-tetrahydropyridino]propionamide, and
N-2-phenylcyclopropyl-β-[4-(4-ethylsulfonylphenyl)-1,2,5,6-tetrahydropyridino]propionamide, respectively.

EXAMPLE 7

When, in the procedure of Example 4, N-2-phenyl-cyclopropyl-β-chloropropionamide is replaced by an equal molar amount of each of the N-cyclopropyl-β-chloropropionamides prepared in Example 2, the following products are produced:

N - cyclopropyl - β - (4-phenyl-1,2,5,6 - tetrahydropyridino)propionamide,
N - (2 - methylcyclopropyl) - β - (4 - phenyl - 1,2,5,6 - tetrahydropyridino)propionamide,
N - (2 - ethylcyclopropyl) - β - (4 - phenyl - 1,2,5,6 - tetrahydropyridino)propionamide,
N - (2 - isopropylcyclopropyl) - β - (4 - phenyl - 1,2,5,6 - tetrahydropyridino)propionamide,
N - (2 - phenylcyclopropyl) - β - (4 - phenyl - 1,2,5,6 - tetrahydropyridino)propionamide,
N - (2 - benzylcyclopropyl) - β - (4 - phenyl - 1,2,5,6 - tetrahydropyridino)propionamide,
N - (2 - 1 - naphthylcyclopropyl) - β - (4 - phenyl - 1,2,5,6-tetrahydropyridino)propionamide,
N - (2 - 2 - naphthylcyclopropyl) - β - (4 - phenyl - 1,2,5,6-tetrahydropyridino)propionamide,
N - (2 - 1 - naphthylmethylcyclopropyl) - β - (4 - phenyl - 1,2,5,6-tetrahydropyridino)propionamide,
N - (2 - pyridylcyclopropyl) - β - (4 - phenyl - 1,2,5,6 - tetrahydropyridino)propionamide,
N - (2 - 3 - thienylcyclopropyl) - β - (4 - phenyl - 1,2,5,6 - tetrahydropyridino)propionamide,
N - (2 - 2 - thienylcyclopropyl) - β - (4 - phenyl - 1,2,5,6 - tetrahydropyridino)propionamide,
N - (2 - 4 - chlorophenylcyclopropyl) - β -(4 - phenyl - 1,2,5,6-tetrahydropyridino)propionamide,
N - (2 - 4 - trifluoromethylphenylcyclopropyl) - β - (4 - phenyl-1,2,5,6-tetrahydropyridino)propionamide,
N - (2 - 4 - methylphenylcyclopropyl) - β - (4 - phenyl - 1,2,5,6-tetrahydropyridino)propionamide,
N - (2 - 2 - fluorophenylcyclopropyl) - β - (4 - phenyl - 1,2,5,6-tetrahydropyridino)propionamide,
N - (2 - 3 - methylphenylcyclopropyl) - β - (4 - phenyl - 1,2,5,6-tetrahydropyridino)propionamide,
N - (2 - 3 - bromophenylcyclopropyl) - β - (4 - phenyl - 1,2,5,6-tetrahydropyridino)propionamide,
N - (2 - 4 - hydroxyphenylcyclopropyl) - β - (4 - phenyl - 1,2,5,6-tetrahydropyridino)propionamide,
N - (2 - 2 - methylaminophenylcyclopropyl) - β - (4-phenyl-1,2,5,6-tetrahydropyridino)propionamide,
N - (2 - 4 - dimethylaminophenylcyclopropyl) - β - (4 - phenyl-1,2,5,6-tetrahydropyridino)propionamide,
N - (2 - 2,6 - dichlorophenylcyclopropyl) - β - (4 - phenyl-1,2,5,6-tetrahydropyridino)propionamide,
N - ( 2 - 4 - methylthiophenylcyclopropyl) - β - (4 - phenyl-1,2,5,6-tetrahydropyridino)propionamide,
N - (2 - 2 - sulfamylphenylcyclopropyl) - β - (4 - phenyl - 1,2,5,6-tetrahydropyridino)propionamide,
N - (2 - 4 - cyclohexylphenylcyclopropyl) - β - (4 - phenyl-1,2,5,6-tetrahydropyridino)propionamide,
N - (2 - 4 - cyclohexyloxyphenylcyclopropyl) - β -(4 - phenyl-1,2,5,6-tetrahydropyridino)propionamide,
N - (2 - 4 - nitrophenylcyclopropyl) - β - (4 - phenyl - 1,2,5,6-tetrahydropyridino)propionamide,
N - (2 - 2 - aminophenylcyclopropyl) - β - (4 - phenyl - 1,2,5,6-tetrahydropyridino)propionamide,
N - (2 - 2 - iodo - 4 - methylphenylcyclopropyl) - β - (4 - phenyl-1,2,5,6-tetrahydropyridino)propionamide,
N - (2 - 4 - isopropylphenylcyclopropyl) - β - (4 - phenyl-1,2,5,6-tetrahydropyridino)propionamide,
N - (2 - 4 - phenylphenylcyclopropyl) - β - (4 - phenyl - 1,2,5,6-tetrahydropyridino)propionamide,
N - (2 - 3 - phenoxyphenylcyclopropyl) - β - (4 - phenyl - 1,2,5,6-tetrahydropyridino)propionamide,
N - (2 - 4 - benzylphenylcyclopropyl) - β - (4 - phenyl - 1,2,5,6-tetrahydropyridino)propionamide,
N - (2 - 3 - acetamidophenylcyclopropyl) - β - (4 - phenyl-1,2,5,6-tetrahydropyridino)propionamide,
N - ( 2 - 4 - acetylphenylcyclopropyl) - β - (4 - phenyl - 1,2,5,6-tetrahydropyridino)propionamide,
N - (2 - 2 - ethylsulfonylphenylcyclopropyl) - β - (4 - phenyl-1,2,5,6-tetrahydropyridino)propionamide,
N - (2 - 2,3-methylenedioxyphenylcyclopropyl) - β - (4 - phenyl-1,2,5,6-tetrahydropyridino)propionamide,
N - (2 - 4 - fluorophenylcyclopropyl) - β - (4 - phenyl - 1,2,5,6-tetrahydropyridino)propionamide,
N - (2 - 4 - chlorobenzylphenylcyclopropyl) - β - (4 - phenyl-1,2,5,6-tetrahydropyridino)propionamide,
N - (2 - 1 - methyl - 2 - naphthylcyclopropyl) - β - (4 - phenyl-1,2,5,6-tetrahydropyridino)propionamide,
N - (2 - 2 - chloro - 1 - naphthylmethylcyclopropyl) - β - (4 - phenyl - 1,2,5,6 - tetrahydropyridino)propionamide, and
N - (2 - phenethylcyclopropyl) - β - (4 - phenyl - 1,2,5,6-tetrahydropyridino)propionamide, respectively.

EXAMPLE 8

When, in the procedure of Example 4, N-2-phenylcyclopropyl-β-chloropropionamide is replaced by an equal molar amount of each of the N-cyclopropyl-β chloro and tosyl alkylamides prepared in Example 3, the following products are produced:

N - (2 - phenylcyclopropyl) - 4 - phenyl - 1,2,5,6-tetra - hydropyridino)acetamide,
N - (2 - phenylcyclopropyl) - α - (4 - phenyl - 1,2,5,6 - tetrahydropyridino)propionamide,
N - (2 - phenylcyclopropyl) - γ - (4 - phenyl - 1,2,5,6 - tetrahydropyrdino)butyramide,
N - (2 - phenylcyclopropyl) - β - (4 - phenyl - 1,2,5,6 - tetrahydropyridino)propionamide,
N - (2 - phenylcyclopropyl) - β - (4 - phenyl - 1,2,5,6 - tetrahydropyridino)propionamide,
N - (2 - phenylcyclopropyl) - γ - (4 - phenyl - 1,2,5,6 - tetrahydropyridino)hexanoamide,
N - (2 - phenylcyclopropyl) - β - (4 - phenyl - 1,2,5,6 - tetrahydropyridino)propionamide.

What is claimed is:
1. A compound selected from the group consisting of compounds of the formula

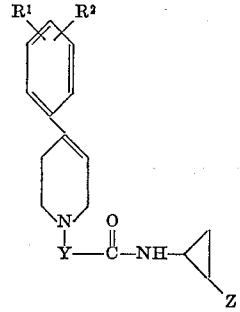

wherein:
R¹ and R² are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, and cycloalkoxy radicals having from 5 to 7 carbon atoms inclusive,
Y is a (lower)alkylene radical,
Z is a member selected from the group consisting of hydrogen, (lower)alkyl, pyridyl, thienyl and radicals of the formulae

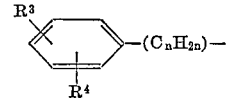

and

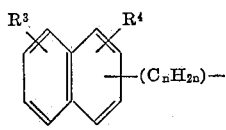

wherein:
   n is a whole integer from 0 to 6 inclusive, and
   $R^3$ and $R^4$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower) alkanoylamino, (lower)alkylthio, sulfamyl, (lower)alkanoyl, (lower)alkylsulfonyl, methylenedioxy, cycloalkyl radicals having from 5 to 7 carbon atoms inclusive, and cycloalkoxy radicals having from 5 to 7 carbon atoms inclusive;
and the pharmaceutically acceptable nontoxic salts thereof.

2. A compound selected from the group consisting of compounds of the formula

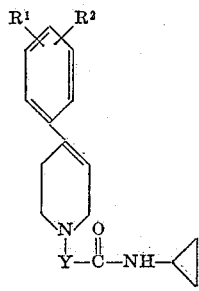

wherein:
   $R^1$ and $R^2$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, and cycloalkoxy radicals having from 5 to 7 carbon atoms inclusive, and
   Y is a (lower)alkylene radical;
and the pharmaceutically acceptable nontoxic salts thereof.

3. A compound selected from the group consisting of compounds of the formula

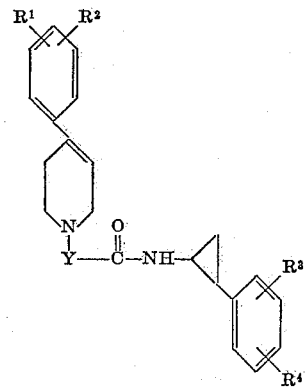

wherein:
   $R^1$, $R^2$, $R^3$ and $R^4$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive, and
   Y is a (lower)alkylene radical;
and the pharmaceutically acceptable nontoxic salts thereof.

4. A compound selected from the group consisting of compounds of the formula

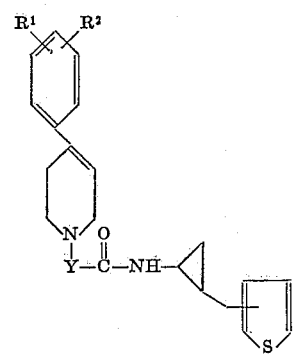

wherein:
   $R^1$ and $R^2$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower) alkanoyl, (lower)alkylsulfonyl, methylenedioxy, cycloalkyl radicals having from 5 to 7 carbon atoms inclusive, and cycloalkoxy radicals having from 5 to 7 carbon atoms inclusive, and
   Y is a (lower)alkylene radical;
and the pharmaceutically acceptable nontoxic salts thereof.

5. A compound selected from the group consisting of compounds of the formula

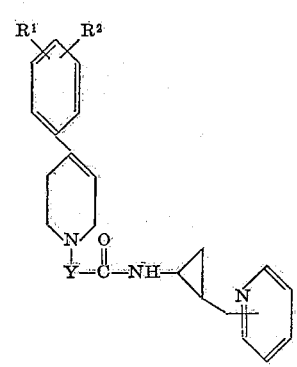

wherein:
   $R^1$ and $R^2$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive; and cycloalkoxy radicals having from 5 to 7 carbon atoms inclusive, and
   Y is a (lower)alkylene radical;
and the pharamaceutically acceptable nontoxic salts thereof.

6. A compound selected from the group consisting of compounds of the formula

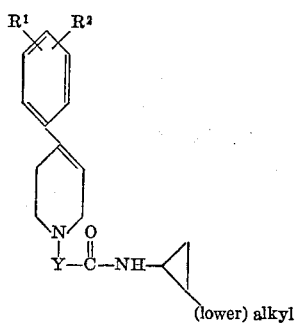

wherein:
R¹ and R² are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive; and cycloalkoxy radicals having from 5 to 7 carbon atoms inclusive, and
Y is a (lower)alkylene radical;
and the pharamaceutically acceptable nontoxic salts thereof.

7. A compound selected from the group consisting of compounds of the formula

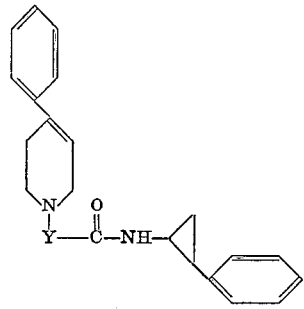

wherein:
Y is a (lower)alkylene radical;
and the pharamaceutically acceptable nontoxic salts thereof.

8. A compound selected from the group consisting of compounds of the formula

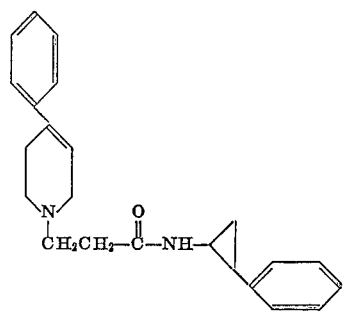

9. A compound of the formula

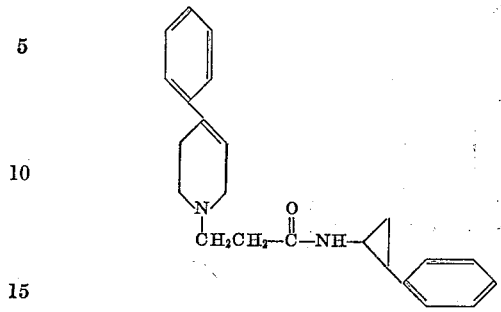

and the pharamaceutically acceptable nontoxic salts thereof.

10. A compound of the formula

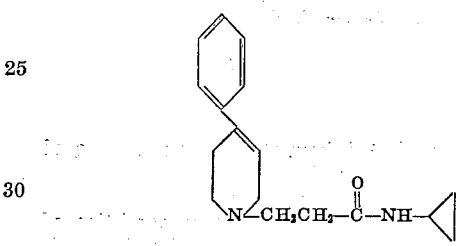

and the pharmaceutically acceptable nontoxic salts thereof.

11. A compound of the formula

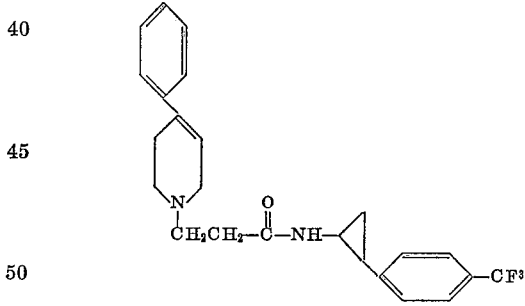

and the pharmaceutically acceptable nontoxic salts thereof.

12. A compound of the formula

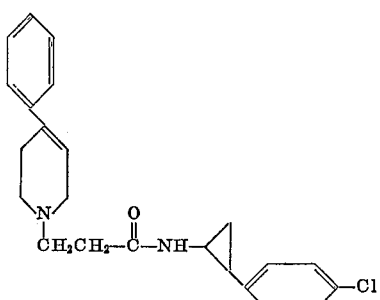

and the pharmaceutically acceptable nontoxic salts thereof.

13. A compound of the formula

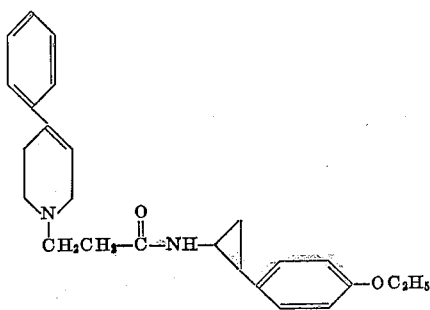

and the pharmaceutically acceptable nontoxic salts thereof.

14. Compounds of the formula

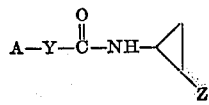

wherein:
A is a member selected from the group consisting of chloro, bromo, iodo and tosyl,
Y is a (lower)alkylene radical, and
Z is a member selected from the group consisting of hydrogen, (lower)alkyl, pyridyl, thienyl and radicals of the formulae

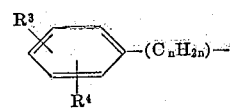

and

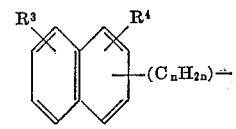

wherein:
$n$ is a whole integer from 0 to 6 inclusive, and
$R^3$ and $R^4$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, and cycloalkoxy radicals having from 5 to 7 carbon atoms inclusive.

References Cited by the Examiner
UNITED STATES PATENTS

| | | | |
|---|---|---|---|
| 2,569,288 | 9/1951 | Cassell et al. | 260—562 |
| 2,929,818 | 3/1960 | Janssen | 260—295 |
| 3,072,648 | 1/1963 | Bonvicino | 260—240 |

WALTER A. MODANCE, *Primary Examiner.*